July 1, 1969     T. F. BROLUND     3,452,632

SHEARING PRESS WITH INTERCHANGEABLE TOOL CARTRIDGES

Filed Aug. 1, 1966     Sheet 1 of 4

INVENTOR
Theodore F. Brolund
by Wolfe, Hubbard, Voit & Osann
ATTORNEY

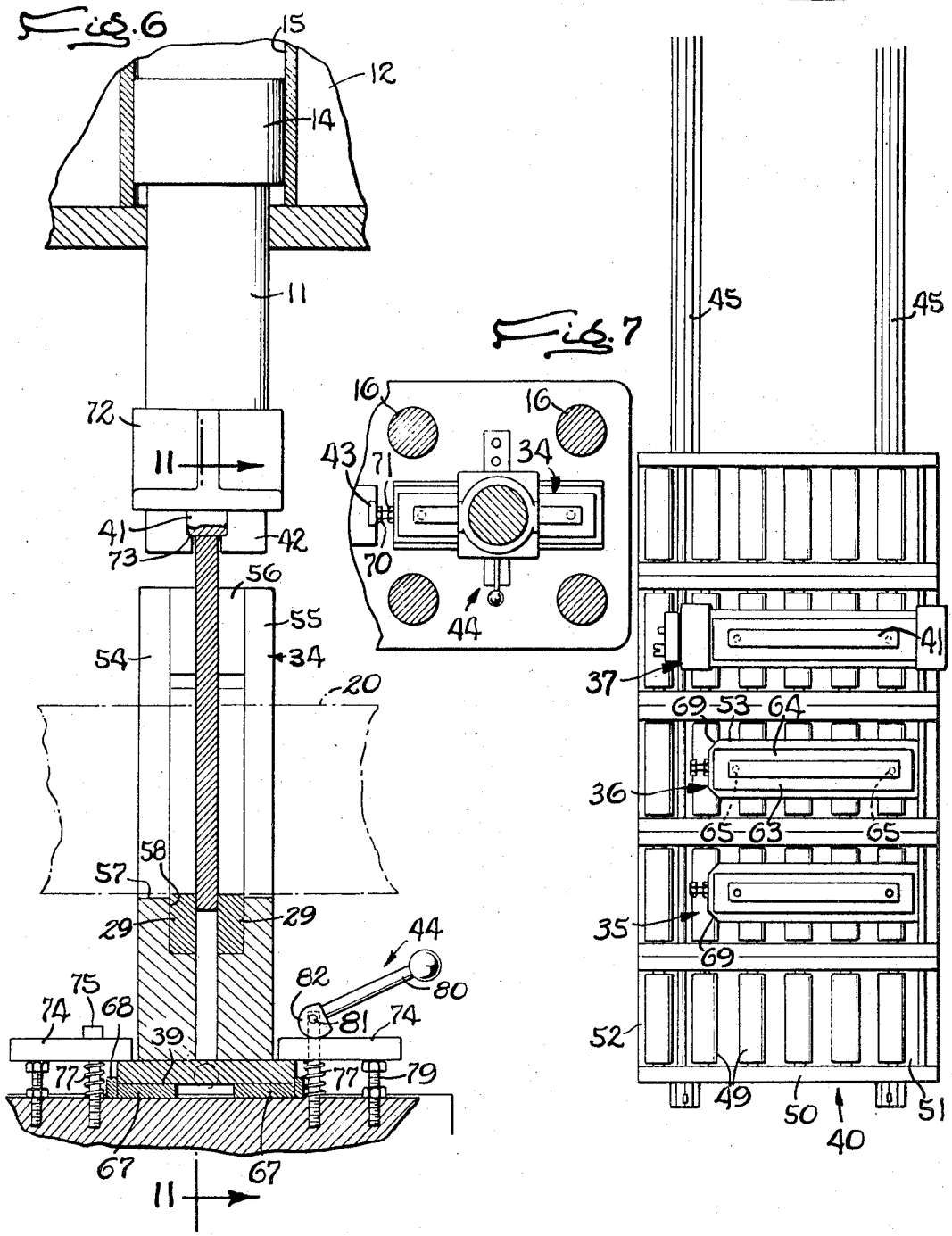

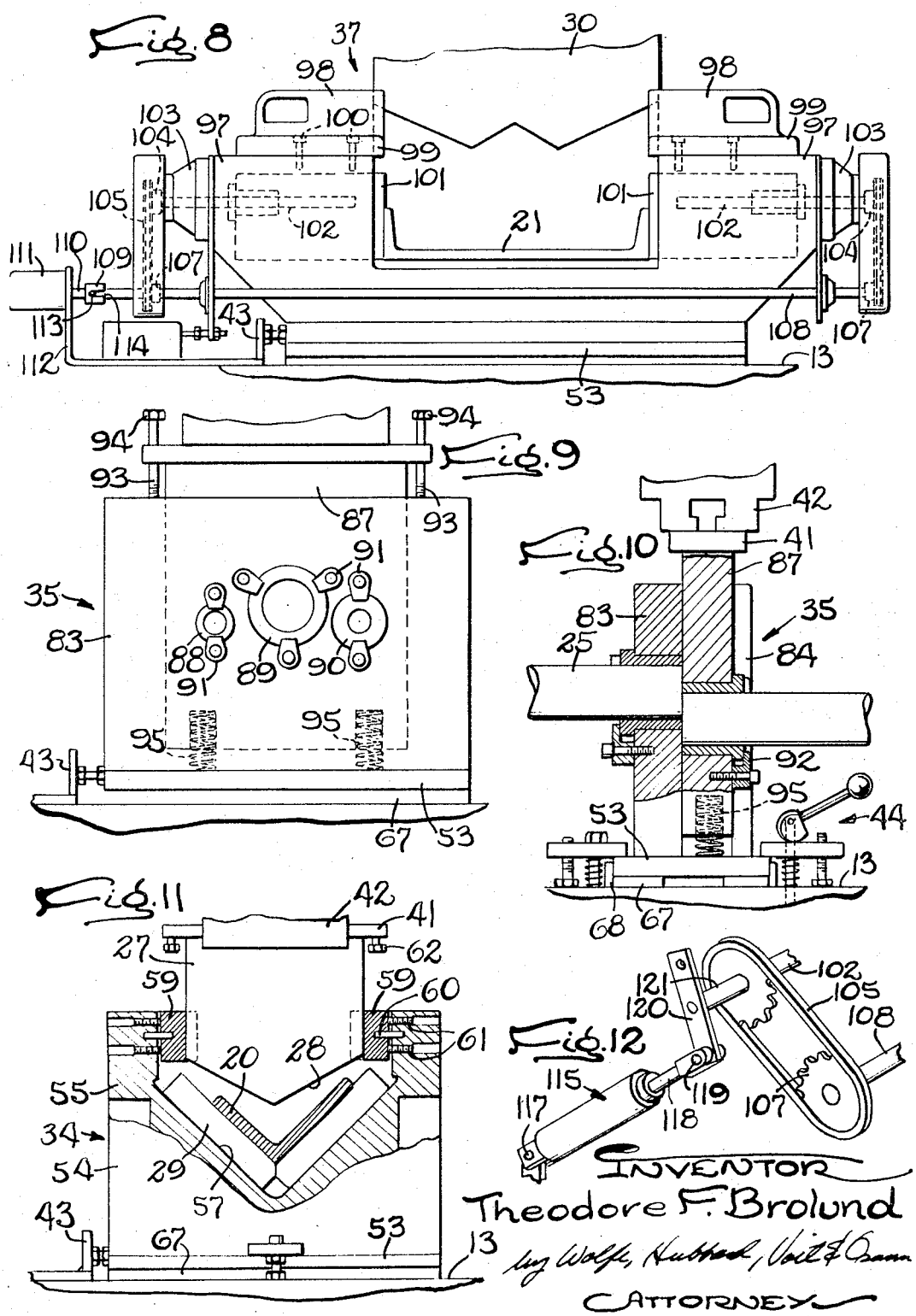

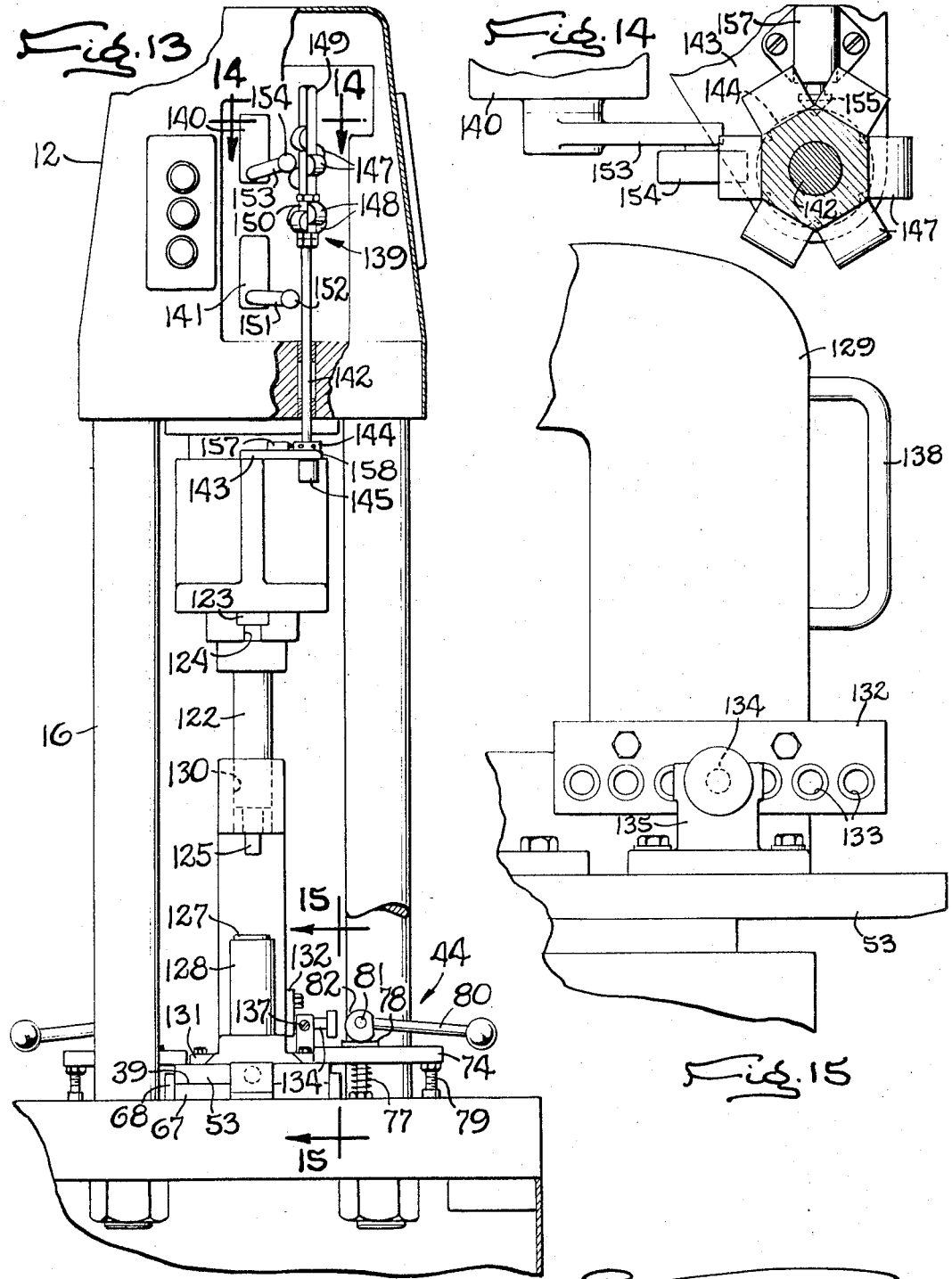

United States Patent Office 3,452,632
Patented July 1, 1969

3,452,632
SHEARING PRESS WITH INTERCHANGEABLE
TOOL CARTRIDGES
Theodore F. Brolund, Rockford, Ill., assignor to W. A.
Whitney Manufacturing Company, Rockford, Ill., a corporation of Illinois
Filed Aug. 1, 1966, Ser. No. 569,132
Int. Cl. B26d 5/12, 4/48
U.S. Cl. 83—549                          22 Claims

ABSTRACT OF THE DISCLOSURE

A shearing press having an associated tool carrier movable back and forth on one side of its base to aline tool selected cartridges on the carrier with the entry end of a slideway on the base for transfer of the cartridge into, and eventually out of, the press along the slideway. Clamps on the base secure the cartridge in place with the shear element or blade alined with the ram of the press and coupled thereto except in the case of one cartridge which is spring-loaded toward the ram and thus not attached thereto. Each cartridge comprises a tool sheath with adjustable side-guide blocks, and studs for positioning the upper end of the tool relative to the ram. The control for the ram has a rotary cam carrier with two groups of angularly spaced cams differently positioned for actuation of the control to terminate strokes of the machine in different positions of the ram.

---

This invention relates to a machine tool having a reciprocating element for performing operations on workpieces and, more particularly, to a shearing press of the general type shown in Patent No. 3,150,551 having a reciprocating actuator or ram carrying a tool element that is guided for movement toward and away from the machine base and a die element thereon for cooperating with the movable element to shear a workpiece disposed between the two elements. As disclosed in the aforesaid patent, different tool sets comprising different types and shapes of tool and die elements are used for different operations, the dies being removably fastened to the machine bed and the movable tool being detachably fastened to the ram and alined with the dies by suitable guides on the bed. The changing of such tooling has been a time-consuming task causing a significant amount of "down" time, particularly where the tooling is large and heavy and, therefore, difficult to handle.

The general object of the present invention is to reduce the tool-changing operation to a relatively simple task that may be performed quickly and easily with a minimum of down time and effort.

A more detailed object is to store a plurality of different sets of tooling in pre-alined and interchangeable cartridge form on a tool support alongside the machine bed for selective manual transfer of each cartridge quickly and easily onto a slideway on the machine bed and into operative association with the ram, and subsequently off the machine bed and back to the tool support.

Another object is to support the cartridges for easy manual sliding to and from the operative position whereby an operator can effect each tool change without power assistance.

A further object is to connect and disconnect the movable tool elements and the ram automatically as an incident to the transfer of the cartridges to and from the machine bed.

Still another object is to support each movable tool element on its respective cartridge in a preselected storage position for movement laterally into operative association with the ram while the latter is in a preselected position for installation of the cartridge.

Another object is to locate and clamp the base of each cartridge rapidly in a precise position on the machine base.

Another object is to provide, in a set of interchangeable tool cartridges, a cartridge having clamping mechanism for firmly gripping and automatically centering channel-shaped workpieces of different sizes relative to the movable tool. A related object is to connect the clamping mechanism to a power operator on the bed quickly and easily as an incident to the transfer of the cartridge to the bed.

Another object is to provide an interchangeable cartridge having tool elements that are selectivly adjustable between a plurality of precisely located positions spaced apart longitudinally of the slideway for the performance of an operation such as punching in different laterally spaced locations on the workpiece.

A further object is to provide a novel stroke controller for selecting different strokes quickly and easily for use with the different tool cartridges whereby the entire operation of changing tooling and adapting the ram stroke for the new tooling is accomplished with a minimum delay.

A more specific object is to provide a stroke control having a plurality of sets of cams supported for rapid movement of any selected set into operative relation with the operator or operators of the control, the different sets being spaced and positioned to produce preselected strikes of the ram.

Other objects and advantages of the invention will become apparent from the following detailed description taken in connection with the accompanying drawings, in which FIGURE 1 is a perspective view of a machine embodying the novel features of the present invention and including a press, a set of interchangeable tool cartridges, and a support therefor.

FIG. 6 is an enlarged fragmentary cross-sectional view taken substantially along the line 6—6 of FIG. 1.

FIG. 7 is a fragmentary view taken in a horizontal plane above the tool support and through the press substantially along the line 7—7 of FIG. 1.

FIG. 8 is an enlarged fragmentary front elevational view of a tool cartridge primarily designed for the shearing of channels.

FIG. 9 is a fragmentary front elevational view of a tool cartridge for shearing bar stock.

FIG. 10 is a fragmentary cross-sectional view taken substantially along the line 10—10 of FIG. 9.

FIG. 11 is a fragmentary cross-sectional view of a tool taken substantially along the line 11—11 of FIG. 6 with the blade in a moved position.

FIG. 12 is a fragmentary perspective view showing an alternate drive mechanism for use with the cartridge of FIG. 8.

FIG. 13 is a fragmentary side elevation taken from the right side of the press in FIG. 1 with a punch cartridge in the machine, parts being broken away for clarity of illustration.

FIG. 14 is an enlarged fragmentary cross-section taken substantially along the line 14—14 of FIG. 13.

FIG. 15 is an enlarged fragmentary view taken along the line 15—15 of FIG. 13.

Figure 1:
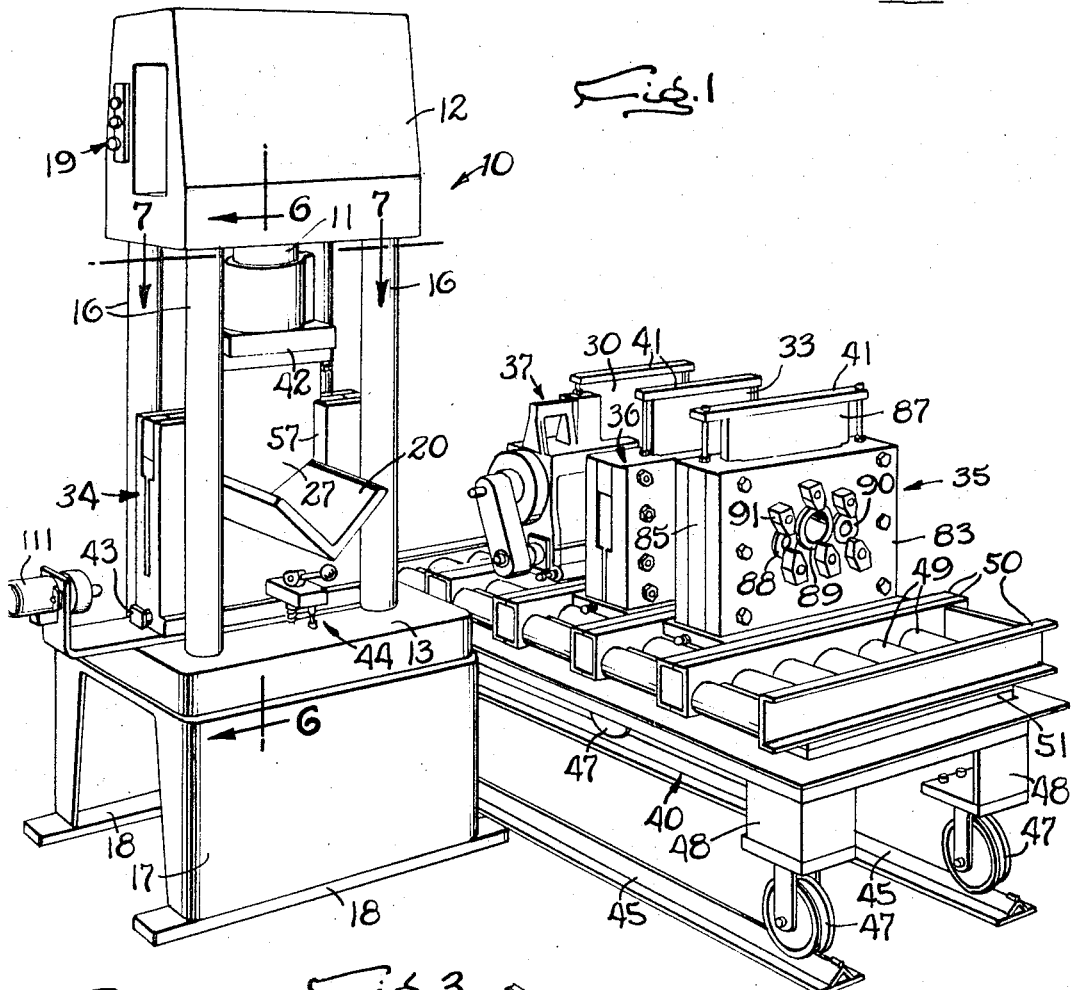

As shown in the drawings for purposes of illustration, the invention is embodied in a hydraulic shearing press 10 having a ram 11 supported on a head 12 for vertical movement toward and away from the machine bed 13 to reciprocate a movable tool element on the ram through forward and return strokes relative to fixed tool elements on the bed cooperating with the movable tool element in performing a machining operation on a workpiece disposed between the elements. A piston 14 (FIG. 6) on the upper end of ram is guided for reciprocation in a vertical bore 15 in the head in response to the admission of pressure fluid to the cylinder alternately on opposite sides of the piston through a suitable control valve (not shown). The head is supported above the bed on four upright posts 16 spaced around the ram, and the bed is supported on a pedestal formed by legs 17 depending from the front and rear walls of the bed and resting on skids 18. The usual start-stop-jog control 19 for the ram is mounted on one side of the head.

Figure 5:
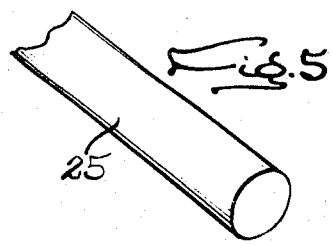

Presses of this type may be used to shear workpieces of various sizes and shapes including angles 20 (FIG. 2), channels 21 (FIG. 3), flat stock 22 (FIG. 4), and bar stock 25 (FIG. 5). To obtain the most effective shearing action for each workpiece, different types of tooling are used for the different workpiece shapes. For example, for angle-shaped pieces, the tooling comprises a movable shearing blade 27 (FIGS. 1, 6 and 11) in the form of a flat plate attached to the ram and having a V-shaped lower end 28, and V-shaped fixed dies 29 secured to the machine bed 13 beneath the ram 11 on opposite sides of the path of reciprocation of the blade. The workpiece is placed on the fixed dies and supported thereon as the blade is pressed through the work. The blade 30 (see FIG. 8) for shearing channels 21 has a shearing edge 31 generally in the form of a W and is movable downwardly between a pair of flat fixed dies 32 secured to the bed, while the blade 33 (FIG. 1) for flat stock preferably is formed with a lower edge (not shown) in the shape of an inverted V cooperating with a pair of flat fixed dies. Die sets with other tool configurations may be provided for other purposes, the general principles governing the design of such tooling being well known to those skilled in the art.

In many instances, a single machine of this type is used to shear several different types of stock at different times. In such a multi-purpose installation, it will be evident that the amount of time required to change and aline tooling when changing from one run to another is an important consideration in terms of "down" time of the machine and the cost of the labor involved in the change. In the past, such tool changing has been a difficult and time-consuming operation, particularly for relatively heavy tooling which has required cranes or the like for handling the tool elements.

In accordance with the present invention, the different sets of tooling are incorporated in self-contained, interchangeable cartridges 34–38 which are supported alongside the machine bed 13 for quick and easy sliding of any selected cartridge directly onto the bed and into a slideway 39 thereon for guiding the cartridges into the proper position relative to the ram 11. Moreover, the cartridges are brought into operative association with the ram for movement thereby automatically as an incident to the transfer to the bed, and are rapidly located and anchored in place to be ready for operation. To these ends, the cartridges 34–38 are disposed alongside the machine bed on a tool support 40 (FIGS. 1 and 7) on which each cartridge is quickly and easily alined with the slideway 39, and each cartridge includes a sheath supporting both the movable and the fixed tool elements in proper alinement with each other, and with a connector 41 on the movable tool positioned for engagement with a mating connector 42 on the ram as the cartridge slides laterally into place on the bed. A stop 43 positioned along the slideway cooperates with the latter in locating each cartridge precisely as desired on the bed, and clamps 44 are provided to anchor the cartridge quickly in the selected location.

Figures 2, 3, 4:
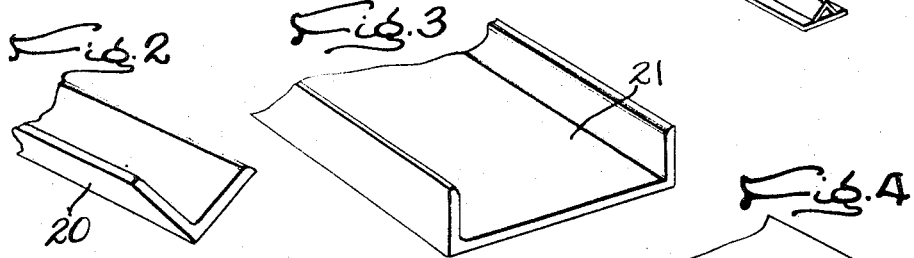
FIGS. 2-5 are fragmentary perspective views of different workpieces adapted to be worked upon by the machine of FIG. 1.

In this instance, the tool support 40 is a movable carrier disposed on the right side of the bed 13, as viewed in FIGS. 1 and 6, and supported for front-to-rear movement along a track formed by two parallel rails 45 guiding wheels 47 journaled on the four legs 48 of the carrier. On top of the carrier are a plurality of side-by-side conveyors each formed by a series of rollers 49 spaced apart laterally of the carrier with coaxial pins projecting from the opposite ends of each roller and journaled in parallel rails 50 extending laterally across the top of the carrier. Herein, the rails are channels fastened to a leveling plate 51 (FIG. 1) on top of the carrier frame 52, the conveyors being positioned to hold each cartridge thereon level with or slightly above the level of the slideway 39 on the machine bed.

Each tool cartridge 34–38 comprises a base 53 in the form of a flat plate for resting on one of the roller conveyors, and a sheath upstanding from the base to support and guide the moveable tool and also to support the fixed die elements in proper alinement with the movable tool. In the case of the cartridge 34 for angle stock, the sheath comprises front and rear plates 54 and 55 (see FIG. 6) disposed in spaced side-by-side relation with the lower edges of the plates secured to the base and the upper edges held apart by spacers 56 fastened between the upper corners of the plates. The central portion of each plate is cut away to form a work-receiving notch 57 with a V-shaped bottom recessed on one side at 58 to support the V-shaped dies 29 which preferably are screwed in place. Blade guides 59 (FIG. 11) are fitted in the recesses between the spacer blocks 56 and the edges of the blade 27, the guides having vertical grooves opening toward and receiving the side edges of the blade. Each guide is held on the adjacent spacer block by a horizontal pin 60 and adjustably positioned horizontally along the pin by two set screws 61 threaded through the spacer and abutting against the adjacent side of the guide.

It will be seen in FIGS. 1, 6 and 11 that the angle-shearing blade 27 is disposed in the sheath between the front and rear plates 54 and 55 with its edges fitted in the grooves of the guides 59 and its upper end spaced above the top of the sheath and fastened by screws to a bar constituting the connector 41 or head for securing the blade to the ram 11. This head is wider than the thickness of the blade and also overhangs both edges of the latter as shown most clearly in FIG. 11. Extending between the top of the sheath and the overhanging ends of the head are two studs 62 which herein are threaded into the underside of the head and abut at their lower ends against the blade guides. Thus, these studs determine the position of the blade while the cartridge is stored on the tool carrier 40, and are adjustable up and down to raise and lower the blade in its storage position.

The cartridge 36 for flat stock 22 is similar to the angle cartridge 34 in most respects, having vertical front and rear plates 63 and 64 (FIG. 7) fastened to the base 53 with work-receiving notches in their upper edges and die seats for holding appropriate flat dies (not shown) on opposite sides of the path of reciprocation of the blade 33 at the bottoms of the notches. Between the upper corners of the plates are two spacer blocks supporting laterally movable blade guides in the manner described for the angle cartridge, and upstanding from the top of the sheath are two adjustable studs 65 which abut against the head 41 of the blade. The latter is guided between the two plates and the two blade guides for vertical reciprocation in the sheath.

To form the slideway 39 for guiding the cartridges 34–38 into position on the machine bed 13, two flat parallel bars 67 (FIGS. 6, 10 and 13) are bolted to the bed with the upper surfaces of the bars level with the conveyors on the tool carrier 40, and two bars 68 are bolted to the remote sides of these bars and project above the latter to guide the bases 53 of the cartridges as they slide along the bars 67. The guide bars are spaced apart a distance slightly greater than the width of each cartridge base for a close fit with the latter, and the corners at the leading end of each base preferably are beveled as shown at 69 to facilitate insertion of the base in the slideway. The stop 43 for locating each cartridge longitudinally with respect to the slideway is an upstanding lug fast on the machine bed at the left end of the slideway as viewed in FIG. 1. For adjustment of the cartridge position, a screw 70 is threaded into the leading end of the base in alinement with the stop lug to engage the latter as the cartridge slides into place, and the screw is locked in the selected position relative to the base by a lock nut 71.

As shown most clearly in FIG. 6, the connector 42 on the ram 11 is a block carried on an adapter sleeve 72 secured to the lower end of the ram, the block being formed with a groove 73 of T-shaped cross-section in its underside parallel to the slideway 39 and open-ended at least at the end facing the tool carrier 40. Accordingly, when the head 41 is alined with the wider portion of the groove 73, the latter receives the head and the upper portion of the blade during transfer of the cartridge along the slideway, and releases the head automatically during the transfer of the cartridge back to the tool carrier, the head and the grooved block constituting tongue-and-groove connectors for the tools.

After a cartridge has been slid into place along the slideway 39 and brought into operative association with the ram 11, the base 53 is anchored securely in place with the clamps 44 which herein are formed by generally horizontal blocks 74 supported for up and down sliding on bolts 75 threaded into the bed on opposite sides of the slideway, the blocks overhanging the opposite sides of the slideway and being urged upwardly by springs 77 encircling the bolts and holding the blocks against the washers 78 thereon. Lock nuts hold the bolts in place relative to the bed but may be loosened to permit raising or lowering of the raised positions of the clamp blocks to insure that the bases 53 will pass freely under the blocks. Adjustable supports 79 are disposed beneath the ends of the blocks remote from the slideway. To operate the clamps, a lever 80 is pivoted at 81 on the upper end of each pin and carries an eccentric cam 82 engaging the washer 78 and operable to press the latter downwardly as the handle is rocked from its raised position shown in broken lines in FIG. 6 to the lowered position shown in full lines. The tops of the cartridge bases are above the level of the guide bars 68, so the clamping blocks are pressed tightly against the top of each base to anchor the latter in place on the bed.

To form the special cartridge 35 for shearing bar stock, front and rear plates 83 and 84 (FIGS. 9 and 10) are fastened to the base plate 53 and spaced apart by upright bars 85 (FIG. 1) on both sides of a central slot slidably guiding a central plate 87 having a head 41 on its upper end. A plurality of bushing-like fixed dies 88–90 are supported in horizontal bores in the front plate and an identical set of movable dies is supported on the central plate in alinement with the fixed dies for insertion of a bar 25 through a selected pair of alined dies. With a bar projecting through the dies, the central plate or blade is displaced vertically as shown in FIG. 10 to shear the bar in the plane between the front plate and the central plate.

It will be seen that the fixed dies 88–90 are formed with annular locating flanges encircling their front ends and clamped against the front plate by lugs 91 held releasably in place by screws threaded into the front plate. The movable dies are similarly held in place by clamping lugs 92 (FIG. 10) abutting against flanges encircling the rear ends of these dies, the central portion of the rear plate 84 being cut away to avoid interference with the movement of the central plate as shown in FIG. 10. The three pairs of dies shown herein are of different sizes for bar stock of different diameters, and are removable for replacement of worn dies and for a further change in die size if this should be desired.

To hold the movable tool element 87 of this die set in a proper storage position with the dies in alinement for insertion of bar stock, two studs 93 project upwardly from the upper ends of the spacer bars 85 and extend loosely through the overhanging ends of the head 41 with nuts 94 threaded onto the studs above the head to abut against the top of the latter and limit upward movement thereof. One of more coiled springs 95 are compressed between the base 53 and the central plate 87 as shown in FIG. 10 to urge the latter upwardly and hold the head against the nuts 94 which are adjustable to vary the raised position of the plate. This cartridge is moved under the ram 11 during insertion onto the slideway 39 and is operated simply by pushing down on the head.

As shown most clearly in FIG. 8, the cartridge 37 for channels comprises a U-shaped body fast on a base plate 53 and having end pieces 97 forming the sides of a work-receiving notch within which the blade 30 moves toward and away from the fixed dies at the bottom of the notch. The vertical edges of the blade slide in grooves in two guides 98 having flanges 99 formed with laterally elongated slots (not shown) receiving mounting screws 100 for holding the guides releasably in selected positions and firmly holding the blade against edgewise deflection. To hold channels of different sizes and avoid distortion of the sidewalls thereoff during shearing, this cartridge is equipped with an automatic clamping mechanism for bracing the sides of the work and also centering the latter beneath the blade automatically as an incident to the clamping operation. It will be seen in FIG. 8 that two blocks 101 are disposed on the opposite sides of the work, these blocks being offset to the rear from the plane of the blade 30 and supported on the respective end pieces 97 for movement toward and away from each other. The blocks are threaded onto two screws 102 extending outwardly through bearings 103 on the end pieces and carry sprockets 104 which are driven by chains 105 trained around sprockets 107 on the opposite ends of a common drive shaft 108. As the drive shaft turns in one direction, the screws drive the blocks toward each other to clamp the work between the opposed sides of the blocks. Reverse turning of the drive shaft turns the screws reversely to retract the blocks into the end pieces and release the workpiece.

Alternate drive arrangements for the channel-clamping mechanism are shown in FIGS. 8 and 12. In FIG. 8, the left end of the drive shaft 108 is received in a cup-like socket 109 on the output shaft 110 of a reversible rotary motor 111 mounted on a bracket 112 on the machine bed, and is keyed to the socket by a pin 113 projecting radially into a notch 114 in the socket. Alternatively, as shown in FIG. 12, the left-hand screw shaft 102 may be driven by a reciprocating motor 115 in the form of a cylinder pivoted at 117 on a bracket on the machine bed 13 with the piston rod 118 pivotally connected by a removable pin 119 to the free end of a crank 120 fast on an extension 121 of the screw shaft. As the piston rod is alternately extended and retracted, the crank oscillates both screws 102 back and forth, first to shift the blocks into clamping engagement with a workpiece, and then to retract the blocks and release the workpiece. Preferably, the clamping motor is controlled by a suitable valve (not shown) which is operated by the control for the ram 11 to clamp a workpiece as the downstroke of the ram begins and to release the work as the upstroke begins. With both types of drive, the blocks are moved simultaneously and equally to center and firmly clamp the work beneath the blade as the latter approaches the workpiece.

The tool cartridge 38 shown in FIGS. 13 and 15 is designed to perform one or more punching operations on a workpiece and, for this purpose, comprises a punch holder 122 attached to the ram by tongue and groove connectors 123 and 124, respectively, and carrying a punch 125 alined with the recess of a die 127 on a die holder 128 supported below the punch on the lower horizontal arm of a C-shaped frame 129. The punch holder is guided in a vertical bore 130 in the upper arm of the C-frame, and the latter is mounted on a base 53 sized to slide along the slideway 39 with a close fit between the guides 68, and to be secured thereto by the clamps 44.

To enable the operator to punch holes in more than one location in a workpiece disposed between the punch 125 and the die 127, the C-frame 129 is mounted on the base 53 for selective adjustment through a plurality of precisely located positions longitudinally of the slideway along a dovetail groove defined between two guides 131 (FIG. 13) having beveled and downwardly diverging sides engaging similarly inclined dovetail surfaces on the lower arm of the C-frame. A locating plate 132 is bolted to one side of the C-frame and formed with a series of horizontally spaced recesses 133 (FIG. 15) for receiving the end of a plunger 134 projecting horizontally through a bracket 135 upstanding from the base 53 alongside the locating plate. Herein, the recesses are through-bores which receive the cylindrical end of the plunger with a snug fit, the plunger being slidable in the bracket 132 and releasably locked in place by a set screw 137. A handle 138 (FIG. 15) is attached to the upright arm of the C-frame to facilitate movement of the latter along the dovetail groove through the different positions relative to the base.

For different cartridges, the length of stroke of the ram 11 is changed to fit the stroke requirements of the particular die set. In order to complete the entire tooling change, including necessary adjustment of the stroke length, as quickly as possible, a stroke selector 139 (FIGS. 13 and 14) is incoporated in the machine to change the upper and lower limits of the stroke rapidly and in an extremely simple manner. For this purpose, the control includes a pair of vertically spaced limit switches 140 and 141 mounted on the head 12, and a vertical shaft 142 journaled in a bracket 143 for rotation about its longitudinal axis. The bracket is fastened to the ram 11 to support the shaft for endwise reciprocation relative to the limit switches in accordance with the reciprocation of the ram relative to the head, a collar 144 and a knob 145 being fast on the shaft above and below the bracket. One the upper end portion of the shaft are a plurality of pairs of longitudinally spaced, angularly alined cams 147 and 148, the various pairs of cams being angularly spaced around the shaft and supported in clusters on two turrets 149 and 150 of hexagonal cross-section telescoped over and secured to the shaft.

The limit switch 141 is mounted on the head 12 below the lower cluster of cams 148 and controls the ram valve to terminate the downstroke of the ram, the switch being actuated by a vertically movable operator arm 151 carrying a follower roller 152 closely adjacent the left side of the selector shaft 142 as viewed in FIG. 13. Downward movement of the switch arm from the normal position shown in FIG. 13 operates the switch to terminate the downstroke. Above the upper cluster of cams 147 is the switch 140 for controlling the upstroke of the ram, this switch having a vertically movable arm 153 carrying another follower 154 adjacent the left side of the shaft. Thus, it will be seen that indexing of the shaft alines different pairs of cams with the switch operators to change the length of the ram stroke by varying the spacing of the operative cams from the respective followers.

The knob 145 facilitates turning of the selector shaft 142 to different positions. To hold the shaft releasably in each selected position, a plunger 155 (FIG. 14) slidable in a housing 157 mounted on the bracket 143 alongside the collar 144 is spring-pressed toward the collar to seat the conical detent end 158 of the plunger in one of the six recesses 159 formed in the periphery of the collar. The plunger preferably is alined with the switches 140, 141 and each recess 158 is alined with a pair of cams 147, 148 to position those cams between the switch operators 151, 153 when the plunger is in the recess. In response to turning of the knob 145, the detent end 158 is cammed out of the associated recess and snaps into each recess that is turned into alinement with the plunger to hold the selector shaft in any position selected by the machine operator. Suitable indicia (not shown) may be provided on the knob or on the collar to identify the stroke length that has been selected in each position of the shaft.

From the foregoing, it will be seen that the complete changeover from one set of tooling to another, including any necessary adjustment in the ram stroke for the new tooling, is a rapid and simple operation requiring, at most, a few minutes time. The operator simply releases the clamps 44 holding the previously used cartridge in place on the slideway 39, slides the cartridge off the bed onto an empty conveyor on the tool carrier 40, shifts the latter endwise to aline the new cartridge with the slideway and pushes the cartridge off the carrier and along the slideway until the stop screw 70 engages the stop 43, bringing the head 41 into proper relation with the ram 11 automatically as an incident to the movement along the slideway. When the base 53 has been anchored in place with the clamps, and the stroke selector 139 has been set for the proper stroke, the machine is ready for operation. If the new cartridge is the channel cartridge 37, the motor 111 or 115 is coupled to the clamping mechanism after the cartridge is in place beneath the ram. The result is a versatile machine in which downtime due to tooling changes is virtually eliminated.

I claim as my invention:

1. In a machine tool, the combination of, a bed, means on said bed defining a slideway having an entry end facing toward one side of the bed, an elongated tool carrier disposed on said one side of said bed, a plurality of interchangeable tool cartridges each having a base resting on said tool carrier, a tool element movably mounted on and guided in each of said cartridges, means supporting said carrier for back and forth movement alongside said bed through a plurality of transfer positions to aline each of said cartridges thereon selectively with said entry end to permit sliding of a cartridge to and from said carrier and said bed, a reciprocating ram supported above said bed for movement toward and away from the bed through forward and return strokes, and connecting means on said tools and said ram movable into operative association for a stroke of said ram automatically as an incident to the transfer of a tool cartridge from said carrier along said slideway.

2. The combination defined in claim 1 in which said slideway is defined between a pair of spaced guides on said bed, each of said bases being sized to slide between said guides with a close fit.

3. The combination defined in claim 2 further including stop means along said slideway engageable with a leading surface on each cartridge to position the latter along the slideway.

4. The combination defined in claim 2 including clamping means on said bed alongside said slideway for anchoring each base releasably in place.

5. The combination defined in claim 2 in which said connecting means comprise alined tongue-and-groove connectors parallel to said slideway and the path of the cartridges thereon whereby said tongue connector interfits with the groove connector as a cartridge moves beneath said ram.

6. The combination defined in claim 5 in which the connectors on said tool elements are held in vertical alinement with the connector on said ram by adjustable elements on said cartridges abutting against said tool element and holding the latter in lowered positions.

7. The combination defined in claim 1 in which said tool carrier has a plurality of spaced roller conveyors supporting said cartridges and selectively alined with said slideway in the different transfer positions of the carrier.

8. The combination defined in claim 1 in which one of said cartridges comprises a movable tool element in the form of a blade, means on said cartridge base guiding said blade for up and down movement, and a fixed die supported on said cartridge alongside the path of said blade to cooperate with the latter in shearing a workpiece disposed between said blade and said die.

9. The combination defined in claim 8 in which said movable element is a shearing blade and said guide means includes two side-by-side plates having lower edges fastened to said base and upper edges spaced apart by blocks between the plates on opposite sides of said path and adjacent the side edges of said blade, said plates having apertures therethrough for the insertion of the workpiece.

10. The combination defined in claim 9 including grooved guide elements slidably guiding the side eges of said blade, and means supporting said guide elements on said plates for adjustment toward and away from each other.

11. The combination defined in claim 9, in which said die is a first bushing secured to one of said plates and said blade is a third plate carrying a second bushing alined with said first bushing, and further including spring means urging said blade upwardly on said cartridge, and a stop on said cartridge holding said blade in a raised position with said bushings alined, said blade being movable beneath said ram as the cartridge is moved along said slideway.

12. The combination defined in claim 8 further including a pair of clamping blocks mounted on said cartridge for movement toward each other and into clamping engagement with the sides of a workpiece, screw mechanism on said cartridge for shifting said blocks equally in opposite directions, reversible drive mechanism on said base for operating said screw mechanism when the cartridge is in place on said slideway, and a releasable connection for coupling the two together.

13. The combination defined in claim 8 in which said guiding means comprises a C-frame and said movable element is a punch and punch-holder assembly guided on the upper arm of said C-frame, said die being supported on the lower arm of the C-frame in alinement with said punch.

14. The combination defined in claim 13 in which said C-frame is mounted on said base for movement longitudinally of said slideway between a plurality of alternate positions, and including means acting between said base and said C-frame to anchor the latter releasably in any selected position.

15. The combination defined in claim 1 further including an operating control for said ram, said control having a cluster of cams angularly spaced around and longitudinally spaced along a supporting shaft, a limit switch for terminating movement of said ram in one direction and having a movable switch operator disposed on one side of said shaft, means supporting said shaft and said switch for relative movement longitudinally of the shaft in accordance with the movements of said head to move said operator along the shaft toward and away from said cluster, and means supporting said shaft for selective indexing into different angular positions with different cams positioned to engage said operator and terminate the ram stroke.

16. The combination defined in claim 15 further including a second limit switch having a movable second operator adjacent one side of said shaft, and a second cluster of cams angularly spaced around said shaft for engagement with said second operator during such relative movement to terminate the ram stroke in the other direction.

17. The combination defined in claim 16 further including a detent releasably holding said shaft in a plurality of angularly spaced positions with different pairs of cams angularly alined with said switch operators.

18. In a machine for operating on workpieces of different shapes, the combination of, a bed, a ram movable toward and away from the bed through forward and return strokes of variable length, a plurality of interchangeable tool cartridges having tools designed for different types of workpieces and movable by said ram through working strokes of different lengths, means on said bed for removably supporting a selected cartridge on said machine with the tool thereof alined with said ram, and a control for said ram stroke including a cam carrier, an operator having a movable follower for actuating said control to terminate the stroke in one direction, means supporting said carrier and said operator for relative longitudinal movement in accordance with the movement of said ram, means supporting said carrier for selective rotation through a plurality of angularly spaced positions, and a plurality of angularly spaced cams on said carrier spaced apart longitudinally thereof, one of said cams being alined with said follower in each of said positions to engage the follower and actuate said control.

19. The combination defined in claim 18 in which said carrier is a shaft parallel to the path of said ram and connected thereto to reciprocate endwise with the ram, said cams being spaced along and around the shaft adjacent one end thereof, and further including a second group of angularly and longitudinally spaced cams, and a second operator for terminating the stroke of said ram in the other direction and having a second follower disposed alongside the shaft for engagement with different cams of said second group.

20. In a machine tool, the combination of, a bed, means on said bed defining a slideway having an entry end facing toward one side of the bed, a plurality of interchangeable tool cartridges each having a base, a movable tool element, means on said base guiding said tool element for reciprocation relative to said base through forward and return strokes, and a fixed tool element for supporting a workpiece and cooperating with the movable element to perform a machine operation thereon, means supporting said cartridges alongside said base for selective alinement with said slideway and transfer along the latter to a preselected operative position on said bed, said supporting means including a tool carrier movable back and forth alongside said base for alinement of cartridges on the carrier with said entry end, and a reciprocating actuator supported on said bed and engageable with the movable element of each cartridge in said operative position to produce said strokes.

21. A tool cartridge for detachable connection to a reciprocating actuator and to the bed of a machine tool, said cartridge having, in combination, a base of predetermined size and shape for resting on said bed, a movable tool element, means on said base guiding said tool element for reciprocation along a predetermined path toward and away from the base, a fixed tool element rigidly mounted on said cartridge on one side of said path for supporting a workpiece and cooperating with the movable element in performing a machine operation thereon, means on said cartridge for holding said movable element in a preselected storage position for movement by the actuator in one direction away from said position, and means on said movable element engageable with the actuator and movable by the latter said guiding means comprising a sheath formed by a pair of side plates upstanding from said base on opposite sides of said path, and a pair of guide blocks supported between said side plates at the opposite side edges of the movable element and adjustable toward and away from the latter.

22. The combination defined in claim 21 in which said movable element has an overhanging head, and said holding means includes a stud extending between said head and the top of said sheath.

(References on following page)

References Cited

UNITED STATES PATENTS

| | | | |
|---|---|---|---|
| 2,545,560 | 3/1951 | Scott | 83—698 X |
| 2,996,025 | 8/1961 | Georgeff | 100—224 X |
| 3,150,551 | 9/1964 | Spengler et al. | 83—635 |
| 3,245,296 | 4/1966 | Valente | 83—698 X |
| 3,296,905 | 1/1967 | Killaly | 83—698 X |
| 3,354,766 | 11/1967 | Daalderop | 83—698 X |

WILLIAM S. LAWSON, *Primary Examiner.*

U.S. Cl. X.R.

83—635, 679, 698, 701; 100—224, 229